United States Patent [19]

Brogan et al.

[11] 4,012,874
[45] Mar. 22, 1977

[54] PROTECTIVE COVER ASSEMBLY FOR UNDERFLOOR ACCESS HOUSING

[75] Inventors: Darryl Keefer Brogan, Bethel Park; Paul Leon Haskins, Aliquippa; Robert George Lindner, Sewickley, all of Pa.

[73] Assignee: H. H. Robertson Company, Pittsburgh, Pa.

[22] Filed: May 12, 1976

[21] Appl. No.: 685,683

[52] U.S. Cl. .................................... 52/99; 52/221; 174/49; 220/3.4

[51] Int. Cl.² ................... E04F 17/08; E04F 19/08; H02G 3/28

[58] Field of Search ............... 52/99, 100, 221, 20; 174/48, 49; 220/3.4, 3.5

[56] References Cited

UNITED STATES PATENTS

| 2,931,533 | 4/1960 | Wiesmann | 52/221 |
| 2,975,559 | 3/1961 | Hedgren | 52/98 |

FOREIGN PATENTS OR APPLICATIONS

| 117,735 | 9/1969 | Norway | 52/20 |

*Primary Examiner*—John E. Murtagh
*Attorney, Agent, or Firm*—Harry B. Keck; George E. Manias

[57] ABSTRACT

A protective cover assembly for an outlet opening of an underfloor access housing is provided to prevent ingress through the outlet opening of a subsequently poured layer of floor fill, such as concrete. The assembly comprises a cup-shaped cap having a fence-like vertical extension detachably connected thereto. The assembly is enveloped by the floor fill and has an upper peripheral edge spaced below the upper surface of the floor fill by up to 1 inch (25.4 mm). A release coating interposed between the protective cover assembly and the floor fill facilitates breakout and removal of the overlying layer of floor fill.

10 Claims, 11 Drawing Figures

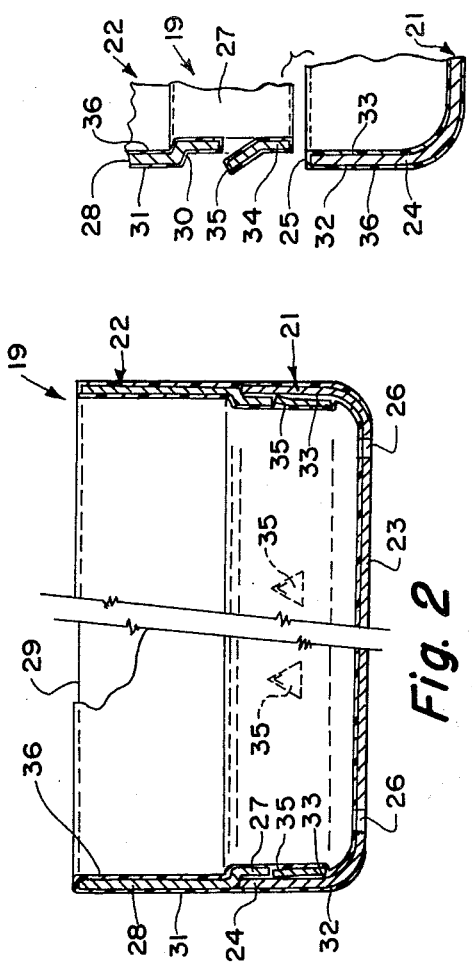
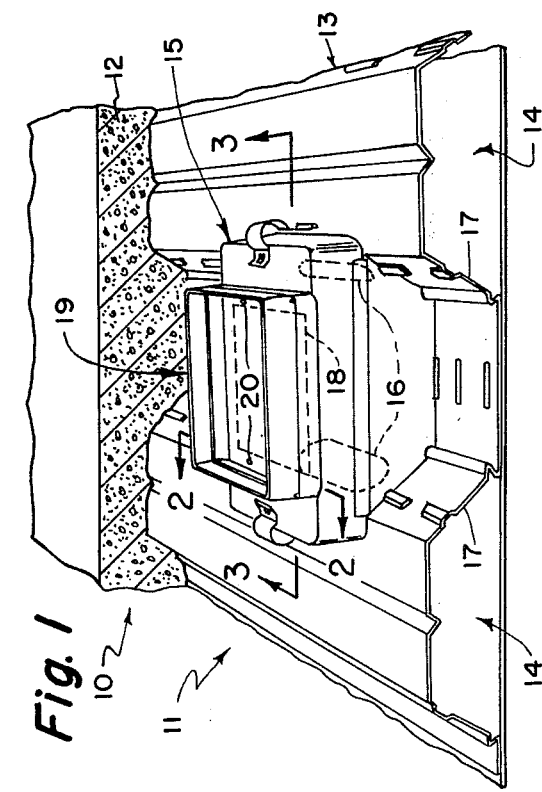
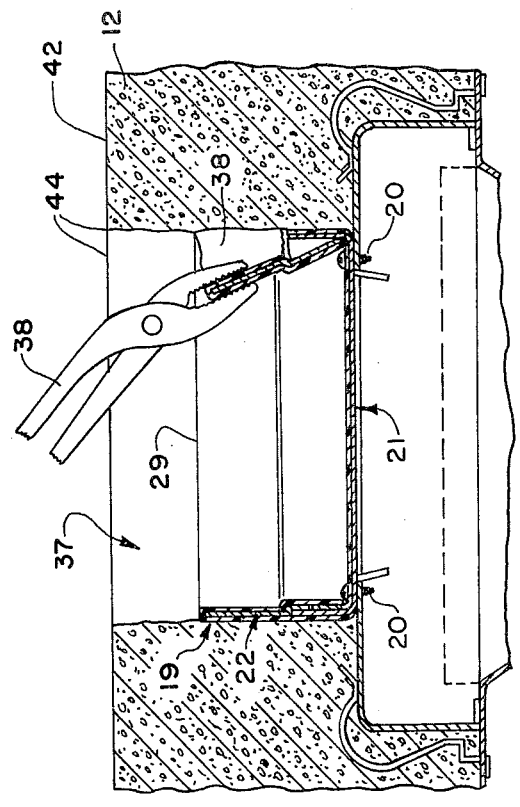
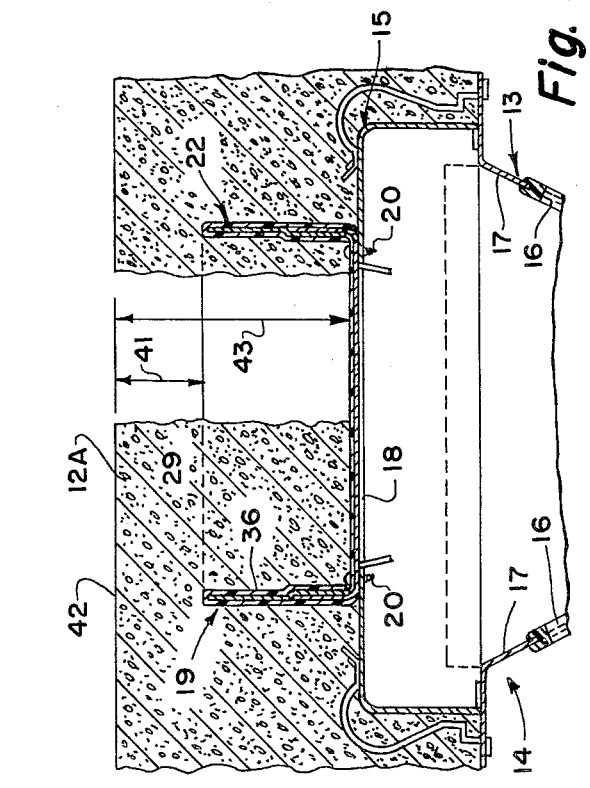

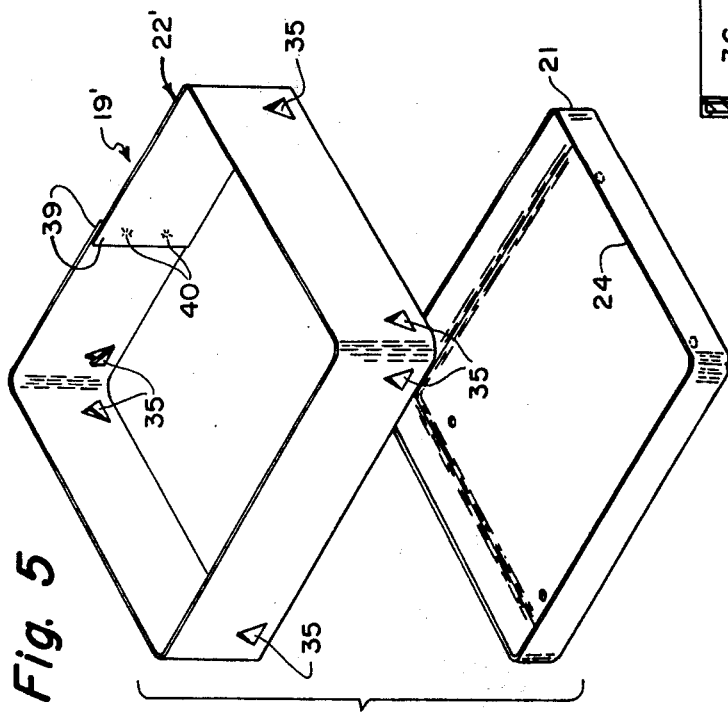

PROTECTIVE COVER ASSEMBLY FOR UNDERFLOOR ACCESS HOUSING

BACKGROUND OF THE INVENTION

1. Field of the Invention

This invention relates to an underfloor access housing providing access to a plurality of electrical services at one location in the floor, and more particularly to improved protective cover assemblies for outlet openings presented by the access housing.

2. Description of the Prior Art

A piston-cylinder assembly for gaining access to raceways through knockouts provided in the upper surface of the raceway is disclosed in U.S. Pat. No. 3,943,673 (LINDAHL et al). A method and structure utilizing a temporary plastic insert covered with adhesion-preventing coating, for forming a recess in a wall is disclosed in U.S. Pat. No. 3,418,767 (SEEGER). The cylinder of LINDAHL et al and the plastic insert of SEEGER present exposed surfaces flush with the surrounding concrete.

Protective caps for outlet openings presented by crossover ducts and underfloor access housings are well-known in the art. U.S. Pat. Nos. 2,975,559 (HEDGREN); 3,093,933 (SLINGLUFF) describe protective caps for crossover ducts. U.S. Pat. Nos. 3,701,837 (FORK); 3,932,696 (FORK et al) describe protective caps for underfloor access housings.

In accordance with the above-identified prior art, a cup-shaped protective cap presents an upper peripheral edge which is spaced below the upper surface or screed line of the floor fill by a relatively short distance, for example one-eighth inch (3.2 mm). Activation of a particular cell is easily accomplished by breaking and removing the relatively thin covering layer of fill above the protective cap to expose the cap for removal.

Modern building constructions utilize composite beams and girders which because of their lighter section, depth and weight, have a tendency to deflect to a greater extent than non-composite beams and girders. For example, the dead load deflection at the center of a large bay can be as much as 1¾ to 2 inches. Because of the deflection, excess concrete may be poured to provide a substantially level floor surface. As a result, the thickness of the floor fill above the upper peripheral edge of the protective caps can exceed the normal one-eighth inch. The excess concrete over the protective caps is a detriment only when it is desired to remove the protective cap. That is, it is not possible to readily remove the covering layer of concrete from the protective cap. Instead, removal of the covering layer of concrete becomes an expensive, time-consuming operation. In some instances, the concrete at the periphery of the thus formed cavity spalls so badly that the periphery thereof must be regrouted. So far as is known, there is not presently a satisfactory economic way of removing the excess covering layer of concrete to gain access to the protective caps.

SUMMARY OF THE INVENTION

The principal object of this invention is to provide an improved protective cover assembly having a release coating provided thereon which facilitates separation of the covering layer of floor fill.

Another object of this invention is to provide an improved protective cover assembly which may receive a covering layer of fill of an overall thickness of up to 2⅜ inches (60.3 mm) and which presents an upper peripheral edge spaced below the upper surface of the floor fill by up to 1 inch (25.4 mm).

Still another object of this invention is to provide a two-piece cover assembly comprising a standard protective cap having a fence-like vertical extension detachably connected thereto — the cover assembly being useful in those areas of the floor structure where excess concrete is expected to be poured.

The present invention concerns a wire distributing floor structure of the type comprising a metal cellular subfloor presenting plural parallel cells and an overlying layer of floor fill, such as concrete, presenting a screed line or upper surface. A cell opening is presented in at least one of the cells. Void forming means, such as an underfloor access housing, encloses the cell opening and presents an outlet opening below the upper surface of the floor fill. A protective cover assembly is provided which covers the outlet opening to protect the same from the concrete.

In accordance with the present invention, the protective cover assembly comprises a protective cap including a base secured to the void forming means and an upstanding peripheral wall, and a fence-like vertical extension detachably connected thereto and having an upper peripheral edge spaced below the upper surface. A release coating is provided on those surfaces of the protective cover assembly which will be juxtaposed with the subsequently poured concrete. The release coating prevents bonding of the concrete to the protective cover assembly, thereby to facilitate breakout and removal of the covering layer of concrete to expose the protective cover assembly for removal.

Further in accordance with the present invention, the coated protective cover assembly may, due to dead load deflection of the beams, girders, and steel floor, be situated at depths many times greater than the maximum one-eighth inch (3.2 mm) depth suggested by the prior art. For example, the upper peripheral edge of the cover may reside at a depth of up to 1 inch (25.4 mm) below the upper surface of the concrete, that is up to eight times the prior art suggested maximum depth. At the 1 inch (25.4 mm) depth, the covering layer of concrete may have a thickness from the cap base to the upper surface of the concrete of up to 2⅜ inches (60.3 mm). The vertical extension drastically reduces the thickness of the concrete which must be broken at the periphery of the to-be-formed cavity. Thus notwithstanding the greater depth, the covering layer of concrete may be quickly broken out to provide a cavity having a peripheral edge requiring minimal, if any, regrouting.

BRIEF DESCRIPTION OF THE DRAWINGS

FIG. 1 is a fragmentary perspective view of a cellular flooring unit having an underfloor access housing mounted thereon which incorporates the improved protective cover assembly of this invention;

FIG. 2 is a broken cross-sectional view taken along the line 2—2 of FIG. 1, illustrating the present protective cover assembly;

FIG. 2A is a fragmentary exploded view of the protective cover assembly;

FIG. 3 is a cross-sectional view taken substantially along the line 3—3 of FIG. 1;

FIG. 4 is a cross-sectional view, similar to FIG. 3, illustrating removal of the protective cover assembly;

FIG. 5 is an exploded isometric view of an alternative embodiment of the present protective cover assembly;

FIG. 6 is a fragmentary cross-sectional view, similar to FIG. 3, illustrating the protective cover assembly enveloped by the floor fill;

FIG. 7 is a fragmentary cross-sectional view, similar to FIG. 6 but with the covering layer of floor fill removed;

FIG. 8 is an exploded isometric view illustrating a further alternative embodiment of the present protective cover assembly;

FIG. 9 is an isometric view of a clip; and

FIG. 10 is a fragmentary cross-sectional view, similar to FIG. 7, illustrating the clip detachably connecting the vertical extension to the protective cap.

DESCRIPTION OF THE PREFERRED EMBODIMENT(S)

FIGS. 1 and 3 illustrate a floor structure 10 comprising a metal subfloor 11 covered by a layer of floor fill, such as concrete 12. The metal subfloor 11 includes metal cellular flooring units 13 providing plural, generally parallel, enclosed cells 14. The metal cellular flooring units 13 are co-mingled with sheet metal decking units (not illustrated) in a preselected pattern to allow for present and future distribution of electrical services throughout the floor structure 10.

Prior to pouring the concrete 12, plural void forming means 15 are provided at selected locations in the metal subfloor 13. The void forming means 15 encloses access openings 16 presented, for example, in the inclined webs 17 of the metal cellular flooring 13. Each of the access openings 16 provides communication between the interior of the void forming means 15 and the cells 14 of the flooring unit 13. The void forming means 15 also presents an outlet opening 18 in the top wall thereof. For a more complete description of the void forming means 15 and its arrangement relative to the metal cellular flooring 13, reference is directed to U.S. Pat. No. 3,932,696, supra, issued Jan. 13, 1976, and assigned to the assignee of the present invention.

PRESENT IMPROVEMENT

A protective cover assembly 19 is secured, for example, by fasteners 20, to the void forming means 15 in capping relation with the initially unused outlet opening 18 to protect the same from the subsequently poured concrete 12. All of the capped outlet openings 18 are available for activation throughout the life of the building.

In accordance with the present invention, the protective cover assembly 19 (FIGS. 2 and 2A) includes a protective cap 21 and a fence-like vertical extension 22 detachably connected thereto. The cap 21 comprises a base 23 and upstanding perimeter wall 24 presenting a top edge 25 (FIG. 2A). The base 23 is provided with openings 26 arranged to receive the fasteners 20 (FIG. 1).

The vertical extension 22 comprises a lower portion 27 surrounded by the perimeter wall 24 of the cap 21, and an upper portion 28 extending above the level of the top edge 25. The upper portion 28 terminates in an upper perimeter edge 29. Preferably the upper portion 28 is laterally offset from the lower portion 27 so as to provide a shoulder 30 (FIG. 2A) which engages the top edge 25 of the perimeter wall 24. The lateral offset also is such that the entire outer perimeter face 31 of the upper portion 28 is substantially flush with the outer perimeter face 32 of the perimeter wall 24. The perimeter wall 24 and the lower portion 27 have interior and exterior surfaces 33, 34 (FIG. 2A), respectively, which constitute confronting surfaces when the extension 22 is installed in the cap 21 as shown in FIG. 2.

Means in the form of plural tangs 35 (FIG. 2A) is provided for detachably connecting the extension 22 to the cap 21. The tangs 35 preferably are formed in the lower portion 27 of the extension 22 and project outwardly from the exterior surface 34 thereof. When assembled (FIG. 2) the tangs 35 frictionally engage the confronting interior surface 33 of the perimeter wall 24 thereby to detachably connect the extension 22 to the cap 21.

A release coating 36 (FIG. 2) is provided on those faces of the protective cover assembly 19 which will be eventually juxtaposed with the concrete 12. A material particularly useful as the release coating comprises a thermoplastic potting compound commercially available under the trade name CLIDERITE, from Thermo Cote, Inc., Patterson, N.J. Other release coating materials found useful in the present invention are two one-part polyurethane coatings commercially available under the trade name CHEMGLAZE II and identified as A074 and A276, from Hughson Chemicals, Lord Corporation, Erie, Penn.

Preferably the cap 21 and the extension 22 each are separately coated with the release coating 36 as illustrated in FIG. 2A. Alternatively the release coating is applied to the protective cover assembly 19 as illustrated in FIG. 2. The release coating 36 may be applied by brushing, dipping as well as other application methods.

It will be observed in FIG. 3 that the protective cover assembly 19 is completely enveloped by the concrete 12. The release coating 36 prevents bonding of the concrete 12 to the assembly 19. The arrangement is such that for future access to electrical service, it is possible to locate beneath the concrete 12 a particular assembly 19. Thereafter the covering layer 12A of concrete, that is that portion of the concrete 12 overlying the assembly 19, is readily broken out to provide a cavity 37 (FIG. 4) within which the assembly 19 is exposed for removal. The fasteners 20 are removed. Thereafter the extension 22 may be readily removed by gripping the upper portion 28 thereof with a suitable tool, such as a pair of pliers 38, and pulling the same out of the cavity 37. The cap 21 is then similarly removed. A suitable electrical floor outlet (not illustrated) may then be affixed to the void forming means 15.

FIGS. 5 to 7 illustrate an alternative embodiment of the protective cover assembly which is identified generally by the numeral 19'. Corresponding numerals will be employed to identify corresponding parts heretofore described.

In this embodiment the fence-like vertical extension 22' comprises a strip of sheet metal shaped to conform with the periphery of the cap 21 and has opposite ends 39 secured in overlapped relation by spot welds 40. The arrangement is such that the perimeter wall 24 of the cap 21 is surrounded by the lower portion 27 of the extension 22' as best shown in FIGS. 6 and 7. Plural tangs 35 (FIG. 5), preferably formed in the extension 22', detachably connect the extension 22' to the cap 21. After the assembly 19' is exposed, the fasteners 20, the cap 21 and the extension 22' are readily removed.

FIGS. 8 to 10 illustrate a further alternative embodiment of the protective cover assembly which is identified generally by the numeral 19''. Corresponding numerals will be employed to identify corresponding parts heretofore described.

In this embodiment, the extension 22'' is detachably connected to the protective cap 21 by means of clips 44. The clip 44 (FIG. 9) preferably is formed from spring steel and comprises a central web 45 having arms 46, 47 extending inwardly from the opposite ends thereof and cooperating therewith to provide lower and upper recesses 48, 49. The arm 47 terminates at its lower end in an outwardly curved flange 50.

The clips 44 (FIG. 8) are frictionally engaged with the lower portions 27 of at least two opposite walls of the extension 22'' — the lower portions 27 being received in the lower recesses 48 of the clips 44. The upper recesses 49 of the clips 44 are presented interiorly of the extension 22'' and are positioned to receive corresponding opposite portions of the perimeter wall 24 of the protective cap 21. It will be appreciated that the outwardly curved flanges 50 of the clips 44 facilitate entry of the perimeter wall portions into the upper recesses 49.

Preferably the caps 21 and the extensions 22' and 22'' each are separately coated with the release coating 36. Alternatively the release coating 36 may be applied as a single coat to each of the protective cover assemblies 19' and 19''.

It has been found that the upper perimeter edge 29 of the assemblies 19, 19' and 19'' may be spaced at a distance indicated by the dimension line 41 in FIGS. 3 and 7, of up to 1 inch (25.4 mm) below the upper surface 42 of the concrete 12. Moreover, the covering layer 12A of concrete may have a thickness measured from the base 23 to the upper surface 42 — see dimension line 43 in FIGS. 3 and 7 — of up to 2⅜ inches (60.3 mm). It will be observed in FIGS. 4 and 7 that with the addition of the extensions 22, 22', the thickness — dimension line 41 — of the concrete 12 which must be broken is reduced. Accordingly the thus formed cavity 37 presents a relatively clean upper cavity edge 44 requiring minimal, if any, regrouting. The breakout and removal of the covering layer 12A of concrete also is greatly assisted by the release coating 36.

We claim:

1. A wire distributing floor structure comprising:
a metal cellular subfloor presenting plural parallel cells,
an overlying layer of concrete presenting an upper surface,
a cell opening in at least one of said cells,
void forming means enclosing said cell opening and presenting an outlet opening below said upper surface,
a protective cover assembly covering said outlet opening to protect the same from said concrete, said protective cover assembly comprising a cap having a base secured to said void forming means and an upstanding perimeter wall, and a fence-like vertical extension detachably connected to said cap and having an upper perimeter edge spaced below said upper surface of said concrete, and
a release coating provided on those surfaces of said protective cover assembly juxtaposed with said concrete to prevent bonding of said concrete to said protective cap, thereby to facilitate breakout and removal of the overlying layer of concrete to expose said protective cover assembly for removal.

2. The floor structure of claim 1 wherein said upper perimeter edge is spaced at a distance of up to 1 inch below said upper surface of said concrete.

3. The floor structure of claim 1 wherein said concrete has a thickness from said base to said upper surface of up to 2⅜ inches.

4. The floor structure of claim 1 wherein said extension and said perimeter wall have confronting faces, and wherein a tang projecting from one of said faces frictionally engages the other of said faces to detachably connect said extension to said cover.

5. The floor structure of claim 1 wherein a lower portion of said extension surrounds said perimeter wall.

6. The floor structure of claim 1 wherein said perimeter wall surrounds a lower portion of said extension.

7. The floor structure of claim 1 wherein an upper portion of said extension has an outer perimeter face which is flush with the outer perimeter face of said perimeter wall.

8. The floor structure of claim 7 wherein a lower portion of said extension resides within said perimeter wall.

9. The floor structure of claim 7 wherein a lower portion of said extension is laterally offset from said upper portion thereby to provide a perimeter shoulder engaged with the upper edge of said perimeter wall.

10. The floor structure of claim 1 wherein clips detachably connect lower portions of said extension to adjacent perimeter wall portions of said cap.

* * * * *